(12) United States Patent
Sahm et al.

(10) Patent No.: US 6,885,505 B2
(45) Date of Patent: Apr. 26, 2005

(54) INTEGRALLY BONDED GOBO

(75) Inventors: William J. Sahm, Wilmington, DE (US); William J. Sahm, Jr., Wilmington, DE (US); Thomas G. Blackiston, Chesapeake City, MD (US)

(73) Assignee: Gobos Togo Inc., New Castle, DE (US)

( * ) Notice: Subject to any disclaimer, the term of this patent is extended or adjusted under 35 U.S.C. 154(b) by 0 days.

(21) Appl. No.: 10/647,366

(22) Filed: Aug. 25, 2003

(65) Prior Publication Data

US 2004/0051955 A1 Mar. 18, 2004

Related U.S. Application Data

(60) Provisional application No. 60/408,083, filed on Sep. 4, 2002.

(51) Int. Cl.⁷ .......................... G02B 27/10; G02B 1/10; G03B 21/00

(52) U.S. Cl. ............................ 359/634; 353/62; 359/586
(58) Field of Search ................................. 359/586, 589, 359/634; 353/30, 62, 84

(56) References Cited

U.S. PATENT DOCUMENTS

| 5,806,951 A | | 9/1998 | Roman et al. ................ 353/84 |
| 5,959,768 A | * | 9/1999 | Hutton ........................ 359/359 |
| 6,081,383 A | | 6/2000 | Tannemyer et al. .......... 359/634 |

* cited by examiner

Primary Examiner—David N. Spector
(74) Attorney, Agent, or Firm—Edward J. Kaliski

(57) ABSTRACT

A gobo is described wherein the superimposed layers are integrally bonded with a continuous and uniform layer of polymerized gluing material. Preferred bonding glues, their required characteristics, and a method for fabricating the integrally bonded gobo are disclosed.

18 Claims, 1 Drawing Sheet

INTEGRALLY BONDED GOBO

This application claims the benefit of Provisional appl. No. 60/408,083, filed Sep. 4, 2002.

FIELD OF THE INVENTION

This invention relates to the field of lighting and particularly to color-image-creating devices known as gobos comprising one or more thin substrates and more particularly to an integrally bonded gobo and a method of making same.

BACKGROUND OF THE INVENTION

Tannemyer et al. in U.S. Pat. No. 6,081,383 teaches a multi-color, pattern-projecting gobo in which a multi-color pattern that is color-separated into single-color components that are disposed to parallel planes in the gobo and at least two of these planes are mutually separated by means of a transparent substrate. Such a gobo may include a plurality of mutually superimposed disc-shaped and transparent substrates each of which may include a dichroic surface coating so as to form a color filter. Thus combinations of the filters are able to reproduce the colors of the multi-color pattern and respective color-emitting surface coatings present a pattern that coincides with the pattern of corresponding color components in the multi-color pattern. The technical advance in the art contributed by this teaching, although not stated per se therein, allows the use of extremely thin substrates thereby vastly improving the focus of the entirety. In the prior art, in which the substrates are thicker, only one image-creating surface is in true focus.

Nevertheless, the gobo made according to Tannemyer et al. has certain deficiencies, which derive from the technique used in bonding the substrates together. The patent discloses a stepped profile assembly in which each successive layer of disc-shaped transparent pattern-bearing substrates is of smaller diameter than the preceding substrate. The patent teaches gluing the discs together by placing glue on the steps. In actual practice, as a person of skill in the art knows, the stepped profile is eliminated except after the initial substrate, the one carrying a blocking pattern. The color separation substrates are all of the same smaller diameter and the glue binding them together while applied around the circumference of the interface is applied in spaced dots of glue. Dots of the adhesive are placed around the edges of unbonded layers and then the next layer is aligned and placed on top to be adhered. Ordinarily the glue used is Dow Silicone # 732 or equivalent (available from Dow). This is a very viscous silicone product. The dotting of glue is important with these bonding techniques. This adhesive polymerizes under the action of the moisture contained in the ambient air. The reaction produces acetic acid, which must be removed by migration. The dots have a large surface area in relation to volume, which facilitates this process. In addition, the dots need to be close to the edge of the layers. The dots also present a minimized area of viscous adhesive, which permits the layers to be moved prior to polymerization to obtain perfect alignment. When a typical gobo is finished (such as those obtainable from Beacon AB of Sweden or their licensees) it contains four layers, adhered with three layers of edge dots of silicone.

There is, however, a negative aspect to this technique: The center of the gobo has air spaces and the layers can flex under load and cause breakage because of this weakness. Moreover, the structure is highly sensitive to impacts. Further, dust, dirt and other unwanted contaminants can work into these air spaces and render the gobo unusable or at least require that compressed air be blasted into the spaces to remove the contaminants. Sometimes even this type of cleaning does not solve the problem and the gobo is rendered useless. In the course of ordinary service, the life of a gobo so made is limited.

It is the object of the invention to improve the service life of gobos of the type taught by Tannemyer et al. by eliminating entrapment of air between facing substrates of the gobo and preventing the incursion of contaminants into the interfaces between layers.

SUMMARY OF THE INVENTION

This object is attained by bonding the substrates of a gobo generally fabricated according to the teaching of Tannemyer et al. gobo not along the periphery of the disc-like substrates but over the entirety of the surfaces between adjoining substrates to form an integrally bonded structure.

To do so, however, requires solution of problems hitherto unresolved. Inasmuch as the temperature at the critical interfaces during extended operation, may rise to the neighborhood of 700 degrees Fahrenheit (371 degrees Celsius), any glue used must have extraordinary physical properties. The bonding means must not be degraded in service. It must not lose adherence. It must not lose clarity. It must not emit liquid or gas or char in place. It must not interfere with or interact with any image formed on any surface. Further it must be amenable to application by a method providing a uniform layer of sufficient thinness not to interfere with the optical properties of the assembly. Finally, the adhesive must permit adjustment of the successive layer during assembly to obtain perfect alignment.

We have found that an adhesive having the above listed properties and a viscosity of about 30,000 cps (centipoise) or less as applied solves the problems of the prior art. Lower viscosity works better. Preferably used is a glue which is a two-part silicone curing by chemical reaction (oxime) of the two parts without emitting a by-product needing removal. Such an adhesive is Product Code SS-5060 made by Silicone Solutions of Twinsburg Ohio which has all the characteristics needed. The as-applied viscosity is in the order of 1000 cps. This glue is a room temperature curing silicone capable of self-leveling application by applying a measured dose at the center of the layer. It can also be applied by using a fine-tipped brush with straight edge leveling at room temperature. In either modality the glue forms a uniform, continuous layer only 0.001–0.002 inches thick (0.025–0.050 mm). The layer so formed is bubble-free and it meets the harsh, alternating temperature conditions of service. Further, this preferred adhesive is non-thixotropic which gives it uniform viscosity after mixing which does not change as a function of shear rate. Prior art adhesives, which are thixotropic, rapidly increase viscosity after mixing and change viscosity under applied pressure interfering with both leveling and adjustment of the layers.

We have also found that a single-part silicone (Silicone Solutions #SS-6001) with an as-applied viscosity of about 30,000 cps or less can be used to form a continuous layer as described above. This product is less preferred because we have found that a maximum diameter surface of 1.5 inches is the largest we can bond with this product compared to up to 2.6 inches diameter with the two-part silicone. In addition this more viscous glue requires the application of a greater volume of materials and yields thicker inter-layers of the order of 0.003–0.007 inches (0.076–0.178 mm) which tend to contribute to breakage when force is applied to the assembly in fabrication.

DETAILED DESCRIPTION OF THE INVENTION

Figure 1:
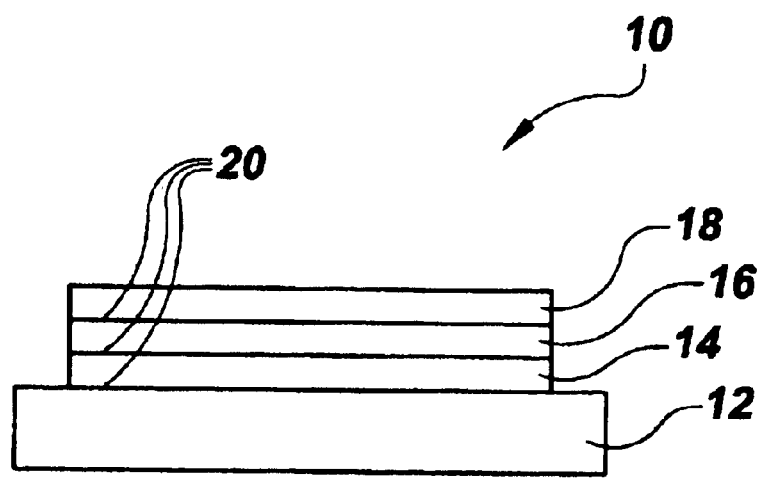
FIG. 1 is a side elevational view of a gobo according to the invention.

Projection lighting has been used in theatrical performance for a long time. In recent times applications have been developed for advertising and sales. The earliest form of projection lighting employed "dias", films of colored plastic and the like held in front of a powerful light.

Instead of dias, thin stainless steel or chrome foils were used but proved limited due to mechanical problems. Heat-resistant glass has had considerable success and is amenable to gray scale ("bende") and rastering to project better images. The greatest advance has been the provision of full color images through the use of color separated images on stacked glass substrates which together form what is termed a "gobo". Roman et al. in U.S. Pat. No. 5,806,951 presents a gobo produced by acid etching. A multi-colored light pattern is formed by first and second substrates having abutting planar surfaces. Each surface includes a complimentary portion of the pattern acid etched in a coating deposited on the surface. At least one coating is dichroic. The substrates are secured in abutting relationship by mechanical means such as by a pair of rings attached with screws. Bulk is one disadvantage of such a structure; lack of permanence is another.

Hutton in U.S. Pat. No. 5,959,768 teaches a reflective layer absorptive to infra-red radiation from which a desired pattern has been removed by laser ablation of a portion of the layer to form an image which can be colored using a filter layer. The problem of assemblage of layers into a compact and permanent form is not addressed.

Tannemyer et al. achieves such a compact and lasting structure as described in the aforementioned U.S. Pat. No. 6,081,383 the teachings of which are incorporated herein by reference.

The improvement of this invention over the prior art is the addition of bonding over the entirety of each interface between substrates.

Refer now to FIG. 1 in which 10 indicates the improved gobo of the invention. Substrate 12 carries the blocking layer, as is known, and is in abutting, facing-relationship with superimposed substrate layer 14 which abuts layer 16 which in turn abuts layer 18. All interfaces between mutually superimposed layers have polymerized continuous and uniform adhesive interlayers 20 to form an integrally bonded structure. Each of layers 14, 16, 18 carries one color separation as is known. Each adhesive (glued) interlayer 20 preferably is about 0.001–0.002 inches (0.254–0.508 mm) thick.

We have found that an adhesive having the above listed properties and a viscosity of about 30,000 cps or less as applied solves the problems of the prior art. Glue which is a two-part silicone, which cures without emitting a by-product needing removal and meets all performance requirements as well is preferred. A two-part silicone glue Product Code SS-5060 made by Silicone Solutions of Twinsburg Ohio has the characteristics needed, particularly an initial; viscosity of 1,000 cps, and is preferred for the interfacing adhesive layers 14, 16, 18. This glue is a room temperature curing, self-leveling and non-thixotropic, silicone. It cures by an oxime reaction, which does not emit by-products that must be removed from the interface. Substrate 12 is held in a fixture. A measured dose is applied at the center of this layer at room temperature, as it will be for successive layers. By measured dose, it is meant that the exact amount or slightly more than enough glue is applied than required to form the desired thin, uniform interlayer of glue. Any slight excess that exudes from the sides is wiped away or cleaned off using mineral spirits or the like. The preferred glue is self leveling and non-thixotropic. The layer being added may be moved to obtain alignment. Glue may also be applied using a fine-tipped brush with straight edge leveling at room temperature. With either technique, a uniform, continuous interlayer is formed. In either case, the interlayer of adhesive is only 0.001–0.002 inches (0.025–0.050 mm) thick and is bubble-free. It meets the harsh, alternating and extreme temperature conditions of service. Relatively large area gobos up to 2.6 inches (66.0 mm) in diameter have been fabricated using this technique. Development of full strength takes up to 72 hours at room temperature but can be significantly accelerated by heating to 150 degrees Fahrenheit (65.6 degrees Celsius) for as little as ten minutes.

The proper amount of as-applied glue can readily be determined by one of skill in the art and will depend upon the characteristics of the particular glue used and the area of the gobo. For example, we have found that for a 2.6 inch (66 mm) diameter gobo using the SS-5060 glue a dose of about 0.2–0.3 ml is adequate for a self-leveling application for a single interfacial layer. This dosage provides some excess, which we wipe away as explained before. We prefer to work with a slight excess rather than risking leaving an uncovered area, an air space, in an interlayer that might contribute to premature failure of the gobo. For a 1.5 inch (38 mm) diameter gobo we have found that a dose of 0.2–0.3 ml serves well.

We have also found that a single-part silicone (Silicone Solutions #SS-6001) with an as-applied viscosity of 30,000 cps can be used to form a continuous interlayer as described above. This product is less preferred because we have found that a maximum diameter surface of 1.5 inches is the largest we can bond with this product compared to up to 2.6 inches with the two-part silicone. As mentioned above, another negative for this glue is that this more viscous glue requires the application of a greater volume of materials and yields thicker interlayers of the order of 0.003–0.007 inches (0.076–0.178 mm). This tends to contribute to breakage when force is applied to the assembly in fabrication.

The single-part process is probably limited by the rate of moisture migration to drive the reaction and by the rate of migration of the reaction products both relative to the rate at which the viscosity of the glue increases with polymerization.

To those skilled in the art, it can be appreciated that the present invention provides a gobo that will survive and serve better than prior art gobos.

It should be understood, of course, that the foregoing relates to preferred embodiments of the invention and that modifications may be made without departing from the spirit and scope of the invention as set forth in the following claims.

What is claimed is:

1. In a gobo for projecting a pattern in several colors wherein the color-separated and rastered single-color components of the pattern are each reproduced in the gobo in a dichroic surface-coating corresponding to respective colors and disposed on a transparent substrate comprising a plurality of mutually superimposed disc-shaped and transparent substrates, each substrate having disposed thereon a dichroic surface-coating for forming a color filter; whereby combinations of the color filters are capable of reproducing the colors of the multi-color pattern; and that respective color-emitting surface coatings present a pattern that coincides with the pattern for corresponding color components in the multi-color pattern, said gobo further including a substrate that has a total-blocking surface coating in a pattern corresponding to the contrast of the multi-color pattern; and in that each substrate has a surface coating on only one side of the substrate;

the improvement comprising: each of the plurality of substrates bonded over the entirety of every surface contiguous to another facing substrate, whereby the gobo is an integrally bonded structure.

2. A gobo according to claim 1 wherein at least one of the disc-shaped substrates has a thickness of less than 0.2 mm.

3. A gobo according to claim 1 wherein the distance between the first and the last pattern-emitting plane in the gobo is less than about 1 mm.

4. A gobo according to claim 1 wherein said gobo includes a first substrate that has material thickness of about 1 mm and a total-blocking coating that presents the pattern of the contrast and that disposed on the first substrate are further substrates each of which has a material thickness of about 0.1 mm and a surface coating that reflects a determined light wavelength interval and that the light wavelength interval corresponds to the light wavelength of the complementary colors to those color into which thy multi-color pattern is separated; and that the surface coatings each present a respective single-color pattern.

5. A gobo according to claim 1 wherein there is deposited on the transparent disc-shaped substrate with the aid of vacuum vaporization technique a dichroic surface-coating which includes alternative layers of high and low refractive index, resulting in reflection of incident light of a determined wavelength interval and the transmissi0on of other incident wavelength, such as to form a color filter.

6. A gobo according to claim 1 wherein the first layer closest to the substrate has a higher reflective index than the second layer in the dichroic layer; has an optical thickness corresponding to a quarter of the wavelength of the color to be reflected; and in that last deposited layer in the surface-coating has an optical thickness corresponding to half the wavelength of the color to be reflected.

7. A gobo according to claim 1 wherein the dichroic layers of higher refractive index have a refractive index greater than 2; in that the dichroic layers of lower refractive index have a refractive index below 1.6; in that the dichroic layers include quartz and titanium dioxide respectively; and in that the dichroic coating includes more than ten layers.

8. A gobo according to claim 1 wherein the bonding is provided by a glue comprising a polymerizable material having an as-applied viscosity of about 30,000 cps or less.

9. A gobo according to claim 1 wherein the bonding is provided by a glue comprising a polymerizable material having an as-applied viscosity of about 1,000 cps.

10. A gobo according to claim 8 wherein the polymerizable material is a single-part silicone polymerizable by reaction with the moisture in the ambient air.

11. A gobo according to claim 9 wherein the polymerizable material is a two-part silicone polymerizable by an oxime reaction.

12. A gobo according to claim 10 wherein the polymerizable material is non-thixotropic.

13. A gobo according to claim 11 wherein the polymerizable material is non-thixotropic.

14. A method of making an integrally bonded gobo comprising the steps of:
 i) providing a blocking substrate and holding it in a fixture;
 ii) applying a measured dose of a polymerizable material to said blocking substrate to form a continuous interlayer;
 iii) superimposing one of a plurality of disc-shaped, transparent substrates each having a pattern thereon on said blocking substrate;
 iv) adjusting said one transparent substrate to align said pattern;
 v) polymerizing said polymerizable material; and
 vi) repeating steps ii)–v) to superimpose and glue all said plurality of substrates: whereby said plurality of mutually superimposed disc-shaped and transparent substrates is bonded to each other and to said blocking substrate to form an integrally bonded gobo.

15. The method of claim 14 wherein the polymerizable material is a two-part silicone glue having an initial viscosity of about 1,000 cps polymerizing by an oxime reaction.

16. The method of claim 14 wherein the polymerizable material is a single-part silicone glue having an initial viscosity of about 30,000 cps polymerizing by a reaction with the moisture in the ambient atmosphere.

17. The method of claim 15 wherein the polymerizable material is non-thixotropic.

18. The method of claim 16 wherein the polymerizable material is non-thixotropic.

* * * * *